United States Patent [19]

Baur et al.

[11] Patent Number: 6,001,798
[45] Date of Patent: Dec. 14, 1999

[54] USE OF MODIFIED POLYASPARTIC ACIDS IN WASHING AGENTS

[75] Inventors: Richard Baur, Mutterstadt; Werner Bertleff, Viernheim; Hans-Ulrich Jäger, Neustadt; Angelika Funhoff, Schriesheim; Matthias Kroner, Eisenberg; Gunnar Schornick, Neuleiningen, all of Germany

[73] Assignee: BASF Aktiengesellschaft, Ludwigshafen, Germany

[21] Appl. No.: 09/029,247

[22] PCT Filed: Aug. 29, 1996

[86] PCT No.: PCT/EP96/03797

§ 371 Date: Mar. 4, 1998

§ 102(e) Date: Mar. 4, 1998

[87] PCT Pub. No.: WO97/09409

PCT Pub. Date: Mar. 13, 1997

[30] Foreign Application Priority Data

Sep. 5, 1995 [DE] Germany .......................... 195 32 717

[51] Int. Cl.$^6$ ..................................... C11D 17/00
[52] U.S. Cl. .......................... 510/490; 510/360; 510/361; 510/476
[58] Field of Search ..................... 510/490, 476, 510/361, 360

[56] References Cited

U.S. PATENT DOCUMENTS

| | | | |
|---|---|---|---|
| 5,656,646 | 8/1997 | Perner et al. | 510/361 |
| 5,747,635 | 5/1998 | Kroner et al. | 528/328 |
| 5,770,553 | 6/1998 | Kroner et al. | 510/360 |

*Primary Examiner*—Yogendra Gupta
*Assistant Examiner*—Christine E. Ingersoll
*Attorney, Agent, or Firm*—Oblon, Spivak, McClelland, Maier & Neustadt, P.C.

[57] ABSTRACT

The use of modified polyaspartic acids which are obtainable by polycondensation of aspartic acid in the presence of, in each case based on the aspartic acid employed, (a) 2.5 to 25 mol % of amines with at least 6 carbon atoms (b) at least 2% by weight of phosphoric acid, phosphorous acid, hypophosphorous acid, polyphosphoric acids, phosphorus pentoxide, phosphonic acids or mixtures of said acids, at temperatures of at least 120° C. and subsequent hydrolysis with bases to give modified polyaspartic acids with a phosphorus content of from 0.5 to 10% by weight, as additive to detergents, and detergents which contain the modified polyaspartic acids in amounts of from 0.1 to 20% by weight.

4 Claims, No Drawings

USE OF MODIFIED POLYASPARTIC ACIDS IN WASHING AGENTS

The invention relates to the use of modified polyaspartic acids in detergents and to detergents which contain the modified polyaspartic acids in amounts of from 0.1 to 20% by weight.

EP-A-0 454 126 discloses detergents which contain 10 to 40% by weight of a surfactant, 5 to 50% by weight of at least one sodium aluminum silicate, 0.5 to 70% by weight of at least one conventionally used additive and 5 to 50% by weight of at least one polyamino acid, preferably polyaspartic acid or polyglutamic acid, as organic cobuilder. Hompolymers of aspartic acid as ingredient of modern detergent formulations are disclosed, for example, in WO-A 94/14939 and WO-A 94/10282. Polyaspartic acid improves the soil release capacity of granular detergents.

WO-A 95/16020 discloses the use of polyaspartic acid which has been prepared by polycondensation of aspartic acid in the presence of phosphoric acid in a molar ratio of from 1:0.05 to 1:10 at temperatures of at least 120° C. to give polysuccinimide and subsequent hydrolysis of the polysuccinimide with bases to give at least partially neutralized polyaspartic acid, as additive to detergents and cleaners in amounts of from 0.1 to 10% by weight. The polyaspartic acids prepared in this way have the advantage, compared with polyaspartic acids which can be prepared by other processes, that they have considerably better biodegradability.

WO-A 94/01486 discloses modified polyaspartic acids obtainable by polycondensation of aspartic acids with fatty acids, polybasic carboxylic acids, anhydrides of polybasic carboxylic acids, polybasic hydroxy carboxylic acids, monobasic polyhydroxy carboxylic acids, alcohols, amines, alkoxylated alcohols and alkoxylated amines, aminosaccharides, carbohydrates, sugar carboxylic acids and/or non-proteinogenous amino carboxylic acids. The modified polyaspartic acids are used as additive to reduced-phosphate and phosphate-free detergents and cleaners, as water-treatment agent and as scale inhibitor in the evaporation of sugar juice.

Although the polyaspartic acids described above confer dispersant properties on the detergent formulations, they do not, on use of the same amount, achieve the same encrustation-inhibiting effect of commercial polymeric cobuilders such as copolymers of acrylic acid and maleic acid with an average molecular weight of 70,000 or of polymaleic acids with a molecular weight of from 1000 to 3000.

It is an object of the present invention to provide an organic cobuilder based on polyaspartic acid which is an improvement compared with the prior art.

We have found that this object is achieved by using modified polyaspartic acids obtainable by polycondensation of aspartic acid in the presence of, in each case based on the aspartic acid employed, (a) 2.5 to 25 mol % of amines with at least 6 carbon atoms and (b) at least 5% by weight of phosphoric acid, phosphorous acid, hypophosphorous acid, polyphosphoric acids, phosphorus pentoxide, phosphonic acids or mixtures of said acids, at temperatures of at least 120° C. and subsequent hydrolysis with bases to give modified polyaspartic acids with a phosphorus content of from 0.5 to 10% by weight, as additive to detergents.

The invention additionally relates to detergents which comprise at least one surfactant and an organic cobuilder and, where appropriate, other conventional ingredients, where the detergents comprise as organic cobuilder 0.1 to 20% by weight of a modified polyaspartic acid obtainable by polycondensation of aspartic acid in the presence of, in each case based on the aspartic acid employed, (a) 2.5 to 25 mol % of amines with at least 6 carbon atoms and (b) at least 2% by weight of phosphoric acid, phosphorous acid, hypophosphorous acid, polyphosphoric acids, phosphorus pentoxide, phosphonic acids or mixtures of said acids, at temperatures of at least 120° C. and subsequent hydrolysis with bases to give modified polyaspartic acids with a phosphorus content of from 0.5 to 10% by weight.

The modified polyaspartic acids to be employed according to the invention as organic cobuilder in detergents can be prepared, for example, by polycondensation of D- or DL-aspartic acid with the compounds indicated above under (a) and (b). Suitable compounds of component (a) are amines with at least 6 carbon atoms. These amines are preferably primary and/or secondary $C_8$–$C_{22}$-alkylamines. Preferred secondary alkylamines are those compounds in which at least one alkyl radical has at least 6 carbon atoms, while the other alkyl radical can have any number of carbon atoms, eg. $C_1$–$C_5$-alkyl. If tertiary amines are employed, they preferably contain an alkyl radical with at least 6 carbon atoms, preferably with at least 10 carbon atoms, while the two other alkyl substituents are preferably $C_1$–$C_5$-alkyl groups.

Examples of amines suitable as component (a) are 2-ethylhexylamine, hexylamine, octylamine, decylamine, tridecylamine, cetylamine, stearylamine, palmitylamine, oleylamine, tallow fatty amine, coconut fatty amine, hydrogenated tallow fatty amine, aniline, toluidine or other substituted aromatic amines and polyisobutenamines which have, for example, 5 to 30 isobutene units. Amines which are particularly preferably employed are dodecylamine, tridecylamine, octadecylamine, stearylamine, palmitylamine, oleylamine, tallow fatty amine or mixtures of these amines. Based on 1 mol of the aspartic acid employed in the polycondensation, from 2.5 to 25, preferably 2.5 to 15, mol % of at least one amine are used.

The polycondensation of the aspartic acid takes place in the presence of phosphoric acid, phosphorous acid, hypophosphorous acid, polyphosphoric acids, phosphorus pentoxide, phosphonic acids or mixtures thereof. Preferably employed as phosphoric acid is technical, 75–85% strength aqueous orthophosphoric acid. However, it is also possible to use 100% strength orthophosphoric acid or metaphosphoric acid. Polyphosphoric acids can likewise be employed, eg. diphosphoric acid (pyrophosphoric acid), triphosphoric acid and higher phosphoric acid homologs. If more than the stoichiometric amounts of phosphoric acid are employed in the condensation, the polycondensation reaction is carried out in phosphoric acid as solvent and diluent. Also suitable as compounds of component (b) are phosphorus pentoxide and phosphonic acids. The phosphonic acids can be characterized, for example, by means of the formula

where R is phenyl or $C_1$–$C_{22}$-alkyl. The compounds of component (b) can be employed either alone or in a mixture in the preparation of the modified polyaspartic acids. They are used in the cocondensation in an amount of at least 5% of the weight of aspartic acid employed. The ratio of aspartic acid to phosphoric acid by weight is, for example, 1:0.05 to 1:10, preferably 1:0.4. Preferably used to prepare the modified polyaspartic acids are (a) primary and/or secondary $C_8$–$C_{22}$-alkylamines and (b) phosphoric acid, phosphorous acid, polyphosphoric acid or mixtures thereof.

The modified polyaspartic acids to be used according to the invention are particularly preferably prepared by polycondensation of (a) dodecylamine, tridecylamine, stearylamine, palmitylamine, oleylamine, tallow fatty amine, coconut fatty amine, hydrogenated tallow fatty amine or mixtures of these amines and (b) phosphoric acid and/or phosphorous acid.

The condensations are carried out at temperatures of at least 120° C., usually in the range from 150 to 250, preferably 160 to 220° C. Based on the aspartic acid employed, 2.5 to 25 mol % of at least one compound of component (a) are used. The polycondensation can be carried out, for example, in such a way that aqueous solutions of components (a) and (b) are added successively or simultaneously to finely divided aspartic acid. The sequence of the addition of the aqueous solutions of components (a) and (b) is immaterial. The components (a) and (b) can be brought into contact with the aspartic acid at room temperature, eg. at 20° C., or else at a higher temperature, eg. at 150° C., under condensation conditions. If components (a) and (b) are mixed in the form of an aqueous solution with the aspartic acid, initially water is distilled out of the reaction mixture. The polycondensation then takes place. However, the polycocondensation can also be carried out in the absence of water. Components (a) and (b) can also be combined and condensed with aspartic acid in the absence of water. The polycocondensation can also be carried out in such a way that initially components (a) and (b) are reacted together at room temperature or elevated temperature, eg. from 20 to 250° C., and the products obtainable in this reaction are cocondensed with aspartic acid. The structure of the reaction products has not yet been elucidated. They are presumably salts and/or products which can be characterized by means of the following formulae:

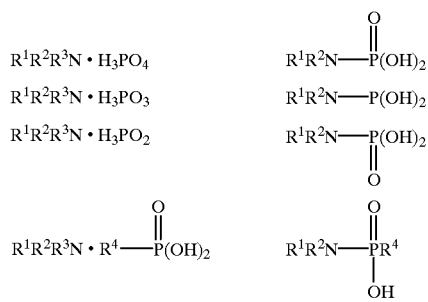

In the formulae indicated above, at least one substituent $R^1$, $R^2$ or $R^3$ is an alkyl group with at least 6 carbon atoms, preferably $C_8$–$C_{22}$-alkyl, and the others are then H or $C_1$–$C_{22}$-, preferably $C_1$–$C_5$-alkyl, $R^4$ is phenyl or $C_1$–$C_{22}$-alkyl.

The reaction products indicated above contain components (a) and (b) in the molar ratio 1:1. However, it is possible to use less than 1 mol of component (a) or the equivalent amount of compounds of component (a), based on the compounds of component (b), eg. up to 3 mol of amine can be used per mol of phosphoric acid, and up to 2 mol of amine can be used per mol of phosphorous acid.

The polycondensation of aspartic acid with components (a) and (b) initially results in products which have succinimide units. The products can be washed with water to remove compounds of component (b), eg. uncondensed phosphoric acid. The polymers containing succinimide units are converted into polymers containing aspartic acid units by hydrolysis with bases. Bases which are preferably used are sodium or potassium hydroxide solution, but ammonia or amines such as ethanolamine, diethanolamine or triethanolamine can also be used for this purpose.

The washing out of the phosphoric acid or the other acids mentioned under (b) with water results in products which still contain bound phosphorus. The content of phosphorus in the modified aspartic acids is 0.5 to 10, preferably 0.6 to 6, % by weight. Modified polyaspartic acids which are particularly preferred for the use according to the invention are those whose phosphorus content is 0.6 to 2% by weight.

The modified polyaspartic acids are employed in an amount of from 0.1 to 20, preferably 1 to 15, % by weight in detergent formulations.

The detergents can be in powder form or else in a liquid formulation. The composition of the detergents and cleaners may vary widely. Detergent and cleaner formulations normally contain 2 to 50% by weight of surfactants and, where appropriate, builders. These data apply both to liquid and to powder detergents. Detergent and cleaner formulations customary in Europe, the USA and Japan are tabulated, for example, in Chemical and Engn. News, 67 (1989) 35. Further details of the composition of detergents and cleaners are to be found in Ullmann's Enzyklopädie der technischen Chemie, Verlag Chemie, Weinheim 1983, 4th Edition, pages 63 to 160.

Reduced-phosphate detergents mean formulations which contain not more than 25% by weight of phosphate, calculated as pentasodium triphosphate. The detergents can be heavy duty detergents or speciality detergents. Suitable surfactants are both anionic and nonionic, or mixtures of anionic and nonionic, surfactants. The preferred surfactant content of the detergents is 8 to 30% by weight.

Examples of suitable anionic surfactants are fatty alcohol sulfates of fatty alcohols with 8 to 22, preferably 10 to 18, carbon atoms, eg. $C_9$–$C_{11}$-alcohol sulfates, $C_{12}$–$C_{13}$-alcohol sulfates, cetyl sulfate, myristyl sulfate, palmityl sulfate, stearyl sulfate and tallow fatty alcohol sulfate.

Other suitable anionic surfactants are sulfated, ethoxylated $C_8$–$C_{22}$-alcohols and their soluble salts. Compounds of this type are prepared, for example, by initially alkoxylating a $C_8$–$C_{22}$-, preferably $C_{10}$–$C_{18}$-alcohol, and subsequently sulfating the alkoxylation product. Ethylene oxide is preferably used for the alkoxylation, in which case 2 to 50, preferably 3 to 20, mol of ethylene oxide are employed per mol of fatty alcohol. However, the alcohols can also be alkoxylated with propylene oxide alone and, where appropriate, butylene oxide. Also suitable are those alkoxylated $C_8$–$C_{22}$-alcohols which contain ethylene oxide and propylene oxide or ethylene oxide and butylene oxide. The alkoxylated $C_8$–$C_{22}$-alcohols may contain the ethylene oxide, propylene oxide and butylene oxide units in the form of blocks or in random distribution.

Further suitable anionic surfactants are alkylsulfonates such as $C_8$–$C_{24}$-, preferably $C_{10}$–$C_{18}$-alkanesulfonates, as well as soaps such as the salts of $C_8$–$C_{24}$-carboxylic acids.

Further suitable anionic surfactants are linear $C_9$–$C_{20}$-alkylbenzenesulfonates (LAS). The polymers according to the invention are preferably employed in detergent formulations with less than 4% of LAS, particularly preferably in LAS-free formulations.

The anionic surfactants are preferably added to the detergent in the form of salts. Suitable cations in these salts are alkali metal ions such as sodium, potassium and lithium ions, and ammonium ions such as hydroxyethylammonium, di(hydroxyethyl)ammonium and tri(hydroxyethyl) ammonium ions.

Examples of suitable nonionic surfactants are alkoxylated $C_8$–$C_{22}$-alcohols. The alkoxylation can be carried out with ethylene oxide, propylene oxide and/or butylene oxide. It is possible to employ as surfactant in this connection all alkoxylated alcohols which contain at least two molecules of one of the abovementioned alkylene oxides in the adduct. Also suitable in this connection are block copolymers of ethylene oxide, propylene oxide and/or butylene oxide, or adducts which contain said alkylene oxides in random distribution. From 2 to 5, preferably 3 to 20, mol of at least one alkylene oxide are used per mol of alcohol. Ethylene oxide is preferably used as alkylene oxide. The alcohols preferably have 10 to 18 carbon atoms.

Another class of nonionic surfactants comprises alkyl polyglucosides with 8 to 22, preferably 10 to 18, carbon atoms in the alkyl chain. These compounds contain 1 to 20, preferably 1.1 to 5, glucoside units.

Another class of nonionic surfactants comprises N-alkylglucamides of the general structure III or IV

where A is $C_6$–$C_{22}$-alkyl, B is H or $C_1$–$C_4$-alkyl and C is polyhydroxyalkyl with 5 to 12 carbon atoms and at least 3 hydroxyl groups. A is preferably $C_{10}$–$C_{18}$-alkyl, B is preferably $CH_3$ and C is preferably a $C_5$ or $C_6$ radical. Compounds of this type are obtained, for example, by acylation of reductively aminated sugars with acid chlorides of $C_{10}$–$C_{18}$-carboxylic acids. The nonionic surfactants preferably present in the detergent formulations are $C_{10}$–$C_{16}$-alcohols preferably ethoxylated with 3–12 mol of ethylene oxide, and particularly preferably ethoxylated fatty alcohols.

Further suitable and preferred surfactants are the endgroup-capped fatty amide alkoxylates of the general formula $$R^1\text{—CO—NH—}(CH_2)_n\text{—O—}(AO)_x\text{—}R^2$$

where
  $R^1$ is $C_5$–$C_{21}$-alkyl or -alkenyl,
  $R^2$ is $C_1$–$C_4$-alkyl,
  A is $C_2$–$C_4$-alkylene,
  n is 2 or 3, and
  x is from 1 to 6,
which are disclosed in WO-A 95/11225.

Examples of such compounds are the products of the reaction of N-butyltriglycolamine of the formula $H_2N$—$(CH_2\text{—}CH_2\text{—}O)_3$—$C_4H_9$ with methyl dodecanoate or the products of the reaction of ethyltetraglycolamine of the formula $H_2N$—$(CH_2\text{—}CH_2\text{—}O)_4$—$C_2H_5$ with a commercial mixture of saturated $C_8$–$C_{18}$-fatty acid methyl esters.

The powdered or granular detergents and, where appropriate, also structured liquid detergents additionally contain one or more inorganic builders. Suitable substances are all conventional inorganic builders such as alumosilicates, silicates, carbonates and phosphates.

Examples of suitable inorganic builders are alumosilicates with ion-exchanging properties such as zeolites. Various types of zeolites are suitable, especially zeolites A, X, B, P, MAP and HS in their Na form or in forms in which Na is partly replaced by other cations such as Li, K, Ca, Mg or ammonium. Suitable zeolites are described, for example, in EP-A 0 038 591, EP-A 0 021 491, EP-A 0 087 035, U.S. Pat. No. 4,604,224, GB-A 2 013 259, EP-A 0 522 726, EP-A 0 384 070A and WO-A 94/24251.

Other suitable inorganic builders are, for example, amorphous or crystalline silicates such as amorphous disilicates, crystalline disilicates such as the sheet silicate SKS-6 (manufactured by Hoechst AG). The silicates can be employed in the form of their alkali metal, alkaline earth metal or ammonium salts. Na, Li and Mg silicates are preferably employed.

Further suitable inorganic builders are carbonates and bicarbonates. These can be employed in the form of their alkali metal, alkaline earth metal or ammonium salts. Preferably employed are Na, Li and Mg carbonates or bicarbonates, especially sodium carbonate and/or sodium bicarbonate.

The inorganic builders can be present in the detergents in amounts of from 0 to 60% by weight, together with organic cobuilders to be used where appropriate. The inorganic builders can be incorporated either alone or in any combination with one another into the detergent. They are added to powdered or granular detergents in amounts of from 10 to 60% by weight, preferably from 20 to 50% by weight. Inorganic builders are added in amounts of up to 40% by weight, preferably up to 20% by weight, to structured (multiphase) liquid detergents. They are suspended in the liquid formulation ingredients.

Powdered or granular, and liquid detergent formulations contain organic cobuilders in amounts of from 0.1 to 20% by weight, preferably from 1 to 15% by weight, together with inorganic builders. The powdered or granular heavy duty detergents may additionally contain as other conventional ingredients a bleaching system consisting of at least one bleach, where appropriate in combination with a bleach activator and/or a bleach catalyst.

Suitable bleaches are perborates and percarbonates in the form of their alkali metal, in particular their Na, salts. They are present in the formulations in amounts of from 5 to 30% by weight, preferably 10 to 25% by weight. Further suitable bleaches are inorganic and organic peracids in the form of their alkali metal or magnesium salts or partly also in the form of the free acids. Examples of suitable organic percarboxylic acids or salts thereof are Mg monoperphthalate, phthalimidopercaproic acid and diperdodecanedioic acid. An example of an inorganic peracid salt is potassium peroxomonosulfate (Oxone).

Examples of suitable bleach activators are
  acylamines such as tetraacetylethylenediamine, tetraacetylglycoluril, N,N'-diacetyl-N,N'-dimethylurea and 1,5-diacetyl-2,4-dioxohexahydro-1,3,5-triazine
  acylated lactams such as acetylcaprolactam, octanoylcaprolactam and benzoylcaprolactam
  substituted phenol esters of carboxylic acids such as Na acetoxybenzenesulfonate, Na octanoyloxybenzenesulfonate and Na nonanoyloxybenzenesulfonate
  acylated sugars such as pentaacetylglucose
  anthranil derivatives such as 2-methylanthranil or 2-phenylanthranil enol esters such as isopropenyl acetate
oxime esters such as acetone O-acetyloxime
carboxylic anhydrides such as phthalic anhydride or acetic anhydride.

Tetraacetylethylenediamine and Na nonanoyloxybenzenesulfonates are preferably employed as bleach activators. The bleach activators are added to heavy duty detergents in amounts of from 0.1 to 15% by weight, preferably from 1.0 to 8.0% by weight, particularly preferably from 1.5 to 6.0% by weight.

Suitable bleach catalysts are quaternized imines and sulfone imines as described in U.S. Pat. No. 5,360,568, U.S. Pat. No. 5,360,569 and EP-A 0 453 003, and Mn complexes, cf., for example, WO-A 94/21777. If bleach catalysts are employed in the detergent formulations, they are present in amounts of up to 1.5% by weight, preferably up to 0.5% by weight, and in the case of the very active manganese complexes in amounts of up to 0.1% by weight.

The detergents preferably contain an enzyme system. This comprises proteases, lipases, amylases and cellulases normally employed in detergents. The enzyme system may be confined to single enzymes or comprise a combination of various enzymes. The commercial enzymes are added to the detergents as a rule in amounts of from 0.1 to 1.5% by weight, preferably 0.2 to 1.0% by weight, of the formulated enzyme. Examples of suitable proteases are Savinase and Esperase (manufactured by Novo Nordisk). An example of a suitable lipase is Lipolase (manufactured by Novo Nordisk). An example of a suitable cellulase is Celluzym (manufactured by Novo Nordisk).

The detergents contain, as other conventional ingredients, preferably soil release polymers and/or antiredeposition agents. Examples of these are polyesters of polyethylene oxides with ethylene glycol and/or propylene glycol and aromatic dicarboxylic acids or aromatic and aliphatic dicarboxylic acids. Polyesters of polyethylene oxides, which are endgroup-capped at one end, with dihydric and/or polyhydric alcohols and dicarboxylic acids. Polyesters of these types are disclosed, for example, in U.S. Pat. No. 3,557,039, GB-A 1 154 730, EP-A 0 185 427, EP-A 0 241 984, EP-A 0 241 985, EP-A 0 272 033 and U.S. Pat. No. 5,142,020.

Further suitable soil release polymers are amphiphilic graft copolymers of vinyl and/or acrylic esters on polyalkylene oxides, cf. U.S. Pat. No. 4,746,456, U.S. Pat. No. 4,846,995, DE-A 3 711 299, U.S. Pat. No. 4,904,408, U.S. Pat. No. 4,846,994 and U.S. Pat. No. 4,849,126 or modified celluloses such as methylcellulose, hydroxypropylcellulose or carboxymethylcellulose.

The detergent formulations contain 0 to 2.5% by weight, preferably 0.2 to 1.5% by weight, particularly preferably 0.3 to 1.2% by weight, of antiredeposition agents and soil release polymers. Soil release polymers which are preferably employed are the graft copolymers of vinyl acetate on polyethylene oxide of molecular weight 2500–8000 in the ratio 1.2:1 to 3.0:1 by weight, which are disclosed in U.S. Pat. No. 4,746,456, and commercial polyethylene terephthalate/polyoxyethylene terephthalates of molecular weight 3000 to 25,000 from polyethylene oxides of molecular weight 750 to 5000 with terephthalic acid and ethylene oxide and a molar ratio of polyethylene terephthalate to polyoxyethylene terephthalate of from 8:1 to 1:1, and the block polycondensates which are disclosed in DE-A 4 403 866 and which contain blocks of (a) ester units from polyalkylene glycols with a molecular weight of 500 to 7500 and aliphatic dicarboxylic acids and/or monohydroxy mono-carboxylic acids and (b) ester units from aromatic dicarboxylic acids and polyhydric alcohols. These amphiphilic block copolymers have molecular weights of from 1500 to 25,000.

A typical powder or granular heavy duty detergent can have the following composition, for example:

3–50, preferably 8–30, % by weight of at least one anionic and/or nonionic surfactant, 5–50, preferably 15–42.5, % by weight of at least one inorganic builder, 5–30, preferably 10–25, % by weight of an inorganic bleach, 0.1–15, preferably 1–8, % by weight of a bleach activator, 0–1, preferably up to a maximum of 0.5, % by weight of a bleach catalyst, 0.05–5% by weight, preferably 0.2–2.5% by weight, of a color transfer inhibitor based on water-soluble homopolymers of N-vinylpyrrolidone or N-vinylimidazole, water-soluble copolymers of N-vinylimidazole and N-vinylpyrrolidone, cross-linked copolymers of N-vinylimidazole and N-vinylpyrrolidone with a particle size of from 0.1 to 500, preferably up to 250 $\mu$m, these copolymers containing 0.01–5, preferably 0.1–2, % by weight of N,N'-divinylethyleneurea as cross-linker. Further color transfer inhibitors are water-soluble and crosslinked polymers of 4-vinylpyridine N-oxide which are obtainable by polymerizing 4-vinylpyridine and subsequently oxidizing the polymers.

0.1–20, preferably 1–15, % by weight of at least one modified polyaspartic acid to be used according to the invention as organic cobuilder, 0.2–1.0% by weight of protease, 0.2–1.0% by weight of lipase, 0.3–1.5% by weight of a soil release polymer.

A bleach system is often entirely or partly dispensed with in color-sparing speciality detergents (for example in color detergents). A typical color detergent in powder or granule form can have, for example, the following composition:

3–50, preferably 8–30, % by weight of at least one anionic and/or nonionic surfactant, 10–60, preferably 20–55, % by weight of at least one inorganic builder, 0–15, preferably 0–5, % by weight of an inorganic bleach, 0.05–5% by weight, preferably 0.2–2.5% by weight, of a color transfer inhibitor, see above, 0.1–20, preferably 1–15, % by weight of at least one modified polyaspartic acid described above as organic cobuilder, 0.2–1.0% by weight of protease, 0.2–1.0% by weight of cellulase, 0.2–1.5% by weight of a soil release polymer, eg. a graft copolymer of vinyl acetate on polyethylene glycol.

The detergents in powder or granule form can contain as other conventional ingredients up to 60% by weight of inorganic fillers. Sodium sulfate is normally used for this purpose. However, the detergents according to the invention preferably have a low filler content and contain up to 20% by weight, particularly preferably up to 8% by weight, of fillers.

The detergents according to the invention may have various apparent densities in the range from 300 to 950 g/l. Modern compact detergents have, as a rule, high apparent densities, eg. 550–950 g/l, and a granular structure.

The liquid detergents according to the invention contain, for example,

- 5–60, preferably 10–40, % by weight of at least one anionic and/or nonionic surfactant,
- 0.05–5% by weight, preferably 0.2–2.5% by weight, of a color transfer inhibitor (see above),
- 0.1–20, preferably 1–15, % by weight of at least one modified polyaspartic acid described above, as cobuilder,
- 0–1.0% by weight of protease,
- 0–1.0% by weight of cellulase,
- 0–1.5% by weight of a soil release polymer and/or antiredeposition agent,
- 0–60% by weight of water,
- 0–10% by weight of alcohols, glycols, such as ethylene glycol, diethylene glycol, propylene glycol or glycerol.

The detergents may, where appropriate, contain further conventional additives. Examples of other additives which may be present where appropriate are complexing agents, phosphonates, optical brighteners, dyes, perfume oils, foam suppressants and corrosion inhibitors.

The percentages in the examples are % by weight unless otherwise indicated.

EXAMPLES

Preparation of Cobuilders 1 to 3

A mixture of 133 g of L-aspartic acid, 326 g of 75% strength phosphoric acid and the amounts of amine stated in Table 1 is introduced into a reactor which has a capacity of 2 l and is equipped with a stirrer and distillation set and is heated with stirring to 100° C. Water is removed from the mixture under water-pump vacuum and at 100° C. The mixture is then heated to 180° C. and maintained at this temperature for 3 hours to carry out the polycondensation. The contents of the reactor are then cooled, the polycondensate is taken up in 1 l of water, the mixture is filtered and the insoluble residue is washed with 1 l of water. The polycondensate which has been washed with water is suspended in 500 ml of water, heated to 60° C. and hydrolyzed by adding 25% strength aqueous sodium hydroxide solution at such a rate that the pH of the reaction solution is always from 8 to 10. The hydrolysis is complete when insolubles are no longer present. Clear or cloudy aqueous solutions of polycocondensates result. A sample of the aqueous solution of the polycondensate is dried and analyzed for the phosphorus content. Table 1 contains information on the properties of the reaction products obtained.

Preparation of Cobuilder 4

150 g of water and 20.4 g of sulfuric acid are introduced into the reactor described above, and then 39.8 g of tridecylamine and subsequently 133 g of aspartic acid are added. The reaction mixture is heated with stirring to 100° C. and water is removed by distillation under waterpump vacuum. The polycondensation takes place by heating the mixture at 180° C. for 5 hours. After cooling, the contents of the reactor are suspended in 70 g of water. 130 g 40 of 25% strength aqueous sodium hydroxide solution are mixed into this suspension over the course of 15 minutes. The pH of the solution is 7.

TABLE 1

| Co-builder | Amine [g] | Acid | Solids content of the solution [%] | P content of the cocondensate [%] | Molecular weight of the cocondensate |
|---|---|---|---|---|---|
| 1 | 20.0 Tridecylamine | $H_3PO_4$ | 40.9 | 1.4 | 15000 |
| 2 | 13.4 Oleylamine | $H_3PO_4$ | 25.2 | 1.1 | 20000 |
| 3 | 14.6 Butylamine | $H_3PO_4$ | 38.1 | 0.2 | 20000 |
| 4 | 39.8 Tridecylamine | $H_2SO_4$ (20.4 g) | 43.4 | — | 4000 |

The detergent formulations described in Table 2 were produced using cobuilder 1. Compositions A–M are compact detergents, N and O are examples of color detergents and formulation P is a structured liquid detergent. The abbreviations in Table 2 have the following meanings:

TAED: Tetraacetylethylenediamine

Soil release additive 1: Polyethylene terephthalate/polyoxyethylene terephthalate in the molar ratio 3:2, molecular weight of a polyethylene glycol in the condensate 4000, molecular weight of the polyester 10000

Soil release additive 2: Graft copolymer of vinyl acetate on polyethylene glycol of molecular weight 8000, molecular weight of the graft copolymer 24000

EO: Ethylene oxide

TABLE 2

| Ingredients | A | B | C | D | E | F | G | H | I | J | K | L | M | N | O | P |
|---|---|---|---|---|---|---|---|---|---|---|---|---|---|---|---|---|
| Lin. alkyl-benzenesulfonate | | | 6 | 6 | 1 | 8 | 9 | 7.5 | | | | | | 2.5 | | 7.5 |
| $C_{12}$–$C_{18}$-Alkyl sulfate | 9 | 9 | 2 | 3 | 12 | | | 1.5 | 10 | 9 | 9 | 9 | 9 | 5 | 9 | 2 |
| $C_{12}$-Fatty alcohol × 2 EO sulfate | | | | | | | | | 3 | | | | | | 2 | |
| $C_{12}$–$C_{18}$-Fatty alcohol × 4 EO | | | | | | | 3 | 4.5 | | | 4 | 4 | | | | |
| $C_{12}$–$C_{18}$-Fatty alcohol × 7 EO | 10 | 10 | | | | | | | | | | | | 13.5 | | 4 |
| $C_{13}$–$C_{15}$-Oxo alcohol × 7 EO | | | | 7 | | 5 | 8 | 10 | | 10 | 10 | | | | | |
| $C_{13}$–$C_{15}$-Oxo alcohol × 11 EO | | | | 4.5 | | | 3 | | | | | | | 2 | 7 | |
| $C_{16}$–$C_{18}$-Glucamide | | | | | | | | | 4 | | | | | | | |

TABLE 2-continued

Detergent compositions A–P

| Ingredients | A | B | C | D | E | F | G | H | I | J | K | L | M | N | O | P |
|---|---|---|---|---|---|---|---|---|---|---|---|---|---|---|---|---|
| $C_{12}$–$C_{14}$-Alkyl polyglucoside | | | | | | | | | | | | 4 | | | | |
| $C_8$–$C_{18}$-Fatty acid methyltetraglycolamide | | | | | | | | | | | | | 6 | | | |
| Soap | 2 | 2 | 1 | | 0.5 | 2 | 0.5 | 0.6 | 1 | 2 | 2 | 2 | 2 | 1.5 | 2 | |
| Na metasilicate × 5.5 $H_2O$ | 2 | 2 | 3.5 | | | 3 | | | | 2 | 2 | 2 | 2 | | | |
| Na silicate | | | | 8 | | | 2.5 | 4 | | | | | | 0.5 | | |
| Mg silicate | | | | | | 0.8 | | | | | | | 0.5 | | | |
| Zeolite A | 18 | 24 | 36 | 35 | 15 | 30 | 36.5 | 25 | 20 | 36 | 24 | 36 | 36 | | 55 | 25 |
| Zeolite P | 18 | | | | | | | | | | | | | 36 | | |
| Sheet silicate SKS 6 (Hoechst AG) | | 12 | | | 14 | | | | 12 | | | | | | | |
| Amorphous sodium disilicate | | | | | | | | | | 12 | 12 | | | | | |
| Sodium carbonate | 12 | 12 | 12 | 11 | | 15 | 10.5 | 10 | 8 | | 12 | 12 | 12 | 6 | | |
| Sodium bicarbonate | | | | | 9 | | | | | | | | | 6.5 | | |
| Sodium citrate | | | | | 5 | | | 7 | 4 | | | | | | | 4 |
| TAED | 4 | 4 | 3.5 | 3.5 | 5.5 | 3 | 4 | 3.8 | 5 | 4 | 4 | 4 | 4 | | | |
| Perborate 4-$H_2O$ | | 15 | | 20 | | 20 | | 24 | | | | | | | | |
| Perborate 2-$H_2O$ | | | | | | | 14.5 | | | | | | | | | |
| Percarbonate | 15 | 15 | | | 18 | | | | 20 | 15 | 15 | 15 | 15 | | | |
| Carboxymethylcellulose | 1 | 1 | 1.5 | 2.5 | 0.5 | 2 | 1 | 1.3 | 1.5 | 1 | 1 | 1 | 1 | 1 | 1 | |
| Soil release additive 1 | 0.8 | 0.8 | 0.8 | | 0.5 | | | 0.5 | 0.5 | | | 0.5 | 0.5 | 0.5 | | |
| Soil release additive 2 | | | | | | | | | | | | 0.5 | 0.5 | | | |
| Lipase | | | | | 0.2 | 0.5 | | 0.5 | 0.5 | | | 0.5 | 0.5 | | | 0.5 |
| Protease | | | | | 0.5 | 0.5 | | 0.5 | 0.5 | | | 0.5 | 0.5 | | 1 | 0.5 |
| Cellulase | | | | | 0.3 | | | | | | | 0.2 | | | | 0.2 |
| Sodium sulfate | 3 | 3 | 3 | 1.5 | 3.5 | 3 | 3.5 | 2.4 | | 3 | 3 | 2.4 | 1.3 | 2 | | |
| Ethanol | | | | | | | | | | | | | | | | |
| Cobuilder 1 | 5 | 5 | 5 | 5 | 5 | 5 | 8 | 5 | 5 | 5 | 5 | 5 | 5 | 5 | 5 | 15 |
| Phosphonate | | | | | | | | | 0.2 | | | 0.2 | | | | 0.5 |
| Opt. brightener | 0.2 | 0.2 | 0.2 | | 0.2 | | | 0.2 | 0.2 | | | 0.2 | 0.2 | | | 0.2 |
| Color transfer inhibitor | | | | | | | | | | | | | | 1.5 | 1 | |
| Water | | | 3.5 | | 3.5 | | | | 0.3 | 1 | 1 | 1 | | 22.5 | 11 | 40.6 |

Cobuilders 1 and 2 described in Table 1 are modified polyaspartic acids to be used according to the invention, while cobuilders 3 and 4 lie outside the invention.

In order to obtain further comparison with the prior art, polyaspartic acids A, B and C were prepared in a known manner and tested as cobuilders in detergent formulations C, D and F shown in Table 2.

Preparation of Polyaspartic Acid A

Aspartic acid was condensed in the presence of phosphoric acid in the molar ratio 2:5 at 160° C. over the course of 6 hours as described in Example 5 of WO-A 95/16020. The polyaspartic acid had a residual phosphorus content of 0.9% and a molecular weight of 30000.

Polyaspartic Acid B

Prepared by condensing maleic anhydride with ammonia by the process of DE-A 4 300 020. Molecular weight of the polyaspartic acid 3000.

Polyaspartic Acid C

Prepared by thermal condensation of L-aspartic acid at 210° C., molecular weight of the polyaspartic acid 6000.

Further detergent formulations were produced by modifying detergent formulations C, D, F and I described in Table 2 by replacing cobuilder 1 by the cobuilders described in Table 3 or preparing formulations which, for comparison, contained no cobuilder. The compositions of these detergent formulations are indicated in Table 2. Table 3 contains the results obtained on testing the incrustation-inhibiting effect. The detergent formulations described in the table were in each case used to wash test fabric made of cotton. The number of wash cycles was 15. After this number of washes, the test fabric was ashed in each case in order to determine the ash content of the fabric.

Washing conditions

Machine: Launder-o-meter from Atlas, Chicago
Number of wash cycles: 15
Wash liquor: 250 ml of liquor
Washing time: 30 min at 60° C.
Detergent dosage: 4.5 g/l
Water hardness: 22.40 German hardness (4 mmol/l Ca; Ca:Mg=4:1)

Test fabric: 20 g of cotton cheesecloth

TABLE 3

Incrustation inhibition by various cobuilders

| Example | Comparative example | Cobuilder | Detergent formulation shown in Table 2 | Cobuilder content in detergent formulation [%] | Ash [%] |
|---|---|---|---|---|---|
| 1 | — | 1 | C | 5 | 1.15 |
| 2 | — | 2 | C | 5 | 1.78 |
| — | 1 | 3 | C | 5 | 2.25 |
| — | 2 | 4 | C | 5 | 2.54 |
| — | 3 | none | C | 0 | 4.77 |
| — | 4 | Polyaspartic acid A | C | 5 | 3.43 |
| — | 5 | Polyaspartic acid B | C | 5 | 4.46 |
| — | 6 | Polyaspartic acid C | C | 5 | 3.24 |
| 3 | — | 1 | J | 5 | 2.49 |
| 4 | — | 2 | J | 5 | 2.07 |
| — | 7 | none | J | 0 | 4.2 |
| 5 | — | 2 | D | 5 | 1.89 |
| — | 8 | Polyaspartic acid A | D | 5 | 2.85 |
| — | 9 | none | D | 0 | 5.14 |
| 6 | — | 2 | F | 5 | 1.6 |
| — | 10 | Polyaspartic acid A | F | 5 | 2.95 |
| — | 11 | Polyaspartic acid B | F | 5 | 4.38 |
| — | 12 | none | F | 0 | 4.35 |

We claim:

1. A detergent comprising at least one surfactant and an organic cobuilder and, optionally, other conventional ingredients, wherein the organic cobuilder comprises 0.1 to 20% by weight of a modified polyaspartic acid obtained by polycondensation of aspartic acid in the presence of, in each case based on the aspartic acid employed, (a) 2.5 to 25 mol % of amines having at least 8 carbon atoms, and (b) at least 2% by weight of phosphoric acid, phosphorous acid, hypophosphorous acid, polyphosphoric acids, phosphorus pentoxide, phosphonic acids or mixtures of said acids,
at temperatures of at least 120° C. and subsequent hydrolysis with bases to produce the modified polyaspartic acid having a phosphorus content of from 0.5 to 10% by weight.

2. A detergent as claimed in claim 1, wherein (a) primary and/or secondary $C_8$–$C_{22}$-alkylamines, and (b) phosphoric acid, phosphorous acid, polyphosphoric acid or mixtures thereof, are employed in the preparation of the modified polyaspartic acid.

3. A detergent as claimed in claim 1, wherein (a) dodecylamine, tridecylamine, cetylamine, stearylamine, palmitylamine, oleylamine, tallow fatty amine, coconut fatty amine, hydrogenated tallow fatty amine or mixtures of these amines, and (b) phosphoric acid and/or phosphorous acid, are employed in the preparation of the modified polyaspartic acid.

4. A detergent as claimed in claim 1, wherein the phosphorus content of the modified polyaspartic acid is 0.6 to 5% by weight.

* * * * *